(12) United States Patent
Huls

(10) Patent No.: US 9,119,373 B2
(45) Date of Patent: Sep. 1, 2015

(54) FACILITIES FOR AND METHOD OF SEPARATING AND SORTING LIVESTOCK

(71) Applicant: LELY PATENT N.V., Maassluis (NL)

(72) Inventor: Michel Hubert Johan Huls, Delft (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 13/647,459

(22) Filed: Oct. 9, 2012

(65) Prior Publication Data

US 2013/0032097 A1 Feb. 7, 2013

Related U.S. Application Data

(63) Continuation of application No. 12/904,325, filed on Oct. 14, 2010, now Pat. No. 8,418,660, which is a continuation of application No. PCT/NL2009/000090, filed on Apr. 9, 2009.

(30) Foreign Application Priority Data

Apr. 14, 2008 (NL) ....................................... 1035289

(51) Int. Cl.
*A01K 1/01* (2006.01)
*A01K 1/00* (2006.01)

(52) U.S. Cl.
CPC .................................. *A01K 1/0023* (2013.01)

(58) Field of Classification Search
CPC ..... A01K 1/12; A01K 1/0017; A01K 1/0023; A01K 3/00; A01K 29/00; A01K 1/0005; A01K 1/0029; A01K 11/006; A01K 1/00

USPC .............. 119/14.03, 502, 510, 516, 520, 524, 119/840, 843
See application file for complete search history.

(56) References Cited

U.S. PATENT DOCUMENTS

| | | |
|---|---|---|
| 5,183,008 A | 2/1993 | Carrano |
| 5,595,144 A | 1/1997 | Loher |
| 5,596,945 A | 1/1997 | Van Der Lely |
| 5,628,284 A | 5/1997 | Sheen |

(Continued)

FOREIGN PATENT DOCUMENTS

| | | |
|---|---|---|
| EP | 0934694 A1 | 8/1999 |
| EP | 1541017 A2 | 6/2005 |

(Continued)

*Primary Examiner* — Kathleen Alker
(74) *Attorney, Agent, or Firm* — Hoyng Monegier LLP; Minerva Rivero; David P. Owen

(57) ABSTRACT

Assembly comprising a passageway for livestock, the passageway being delimited by side delimitations, for passage of the livestock from a first space to a second space. The assembly comprises a gate system mounted in the passageway, the gate system comprising at least one self-closing gate leaf which is movable between a closed position and one or more open positions which include a pass position wherein passage to the second space is possible for an animal from the livestock, and wherein the gate leaf is moveable to an open position by pressure exerted by an animal from the livestock for passing through the passageway to the second space. The assembly also comprises a device for determining an ID of an animal from the livestock, and a device for blocking the gate leaf from moving to the pass position, wherein the blocking device can be activated to a blocking position in response to data from the ID determining device.

8 Claims, 15 Drawing Sheets

(56) References Cited

U.S. PATENT DOCUMENTS

| | | | |
|---|---|---|---|
| 5,704,311 A | 1/1998 | Van Den Berg | |
| 5,803,015 A | 9/1998 | Rhodes et al. | |
| 5,979,365 A | 11/1999 | Sorraghan et al. | |
| 6,019,061 A | 2/2000 | Schulte | |
| 6,341,582 B1 | 1/2002 | Gompper et al. | |
| 6,859,004 B2 | 2/2005 | Hormann | |
| 8,132,539 B2 * | 3/2012 | Epling | 119/524 |
| 2002/0108584 A1 * | 8/2002 | van der Lely et al. | 119/502 |
| 2003/0066492 A1 | 4/2003 | Fransen et al. | |
| 2006/0267780 A1 * | 11/2006 | Adams | 340/573.1 |
| 2009/0223454 A1 * | 9/2009 | Van Den Berg et al. | 119/14.04 |

FOREIGN PATENT DOCUMENTS

| | | | |
|---|---|---|---|
| FR | 2598236 A | 11/1987 | |
| GB | 1468676 A | 3/1977 | |
| GB | 2190945 A | 12/1987 | |
| JP | 06225658 A * | 8/1994 | A01K 29/00 |
| NL | 7413707 A | 4/1975 | |
| WO | WO 9505735 A1 | 3/1995 | |
| WO | WO 01/08468 A1 | 2/2001 | |
| WO | WO 03/103380 A1 | 12/2003 | |
| WO | WO 2004/049790 A1 | 6/2004 | |
| WO | WO 2007117134 A1 | 10/2007 | |

* cited by examiner

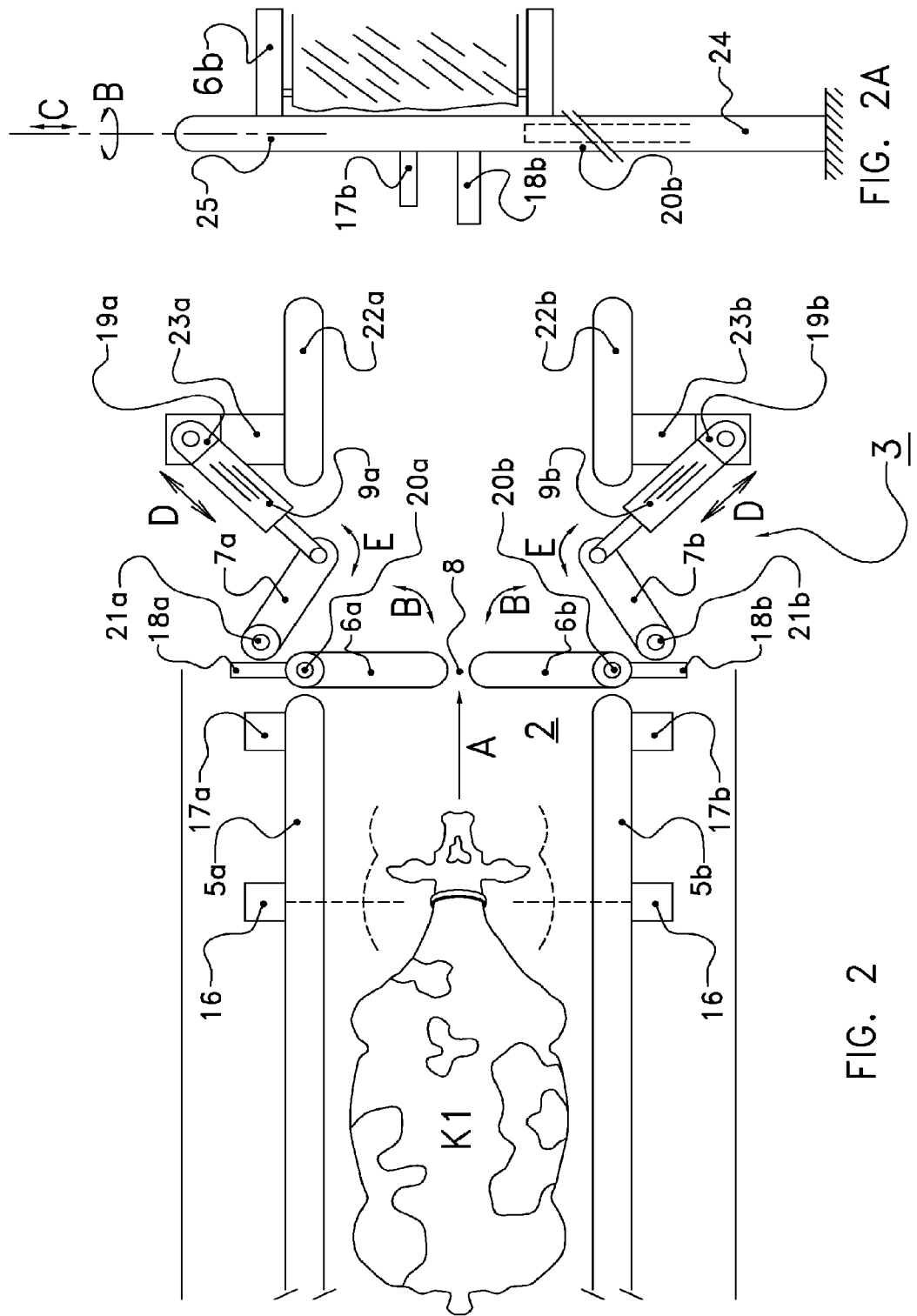

FACILITIES FOR AND METHOD OF SEPARATING AND SORTING LIVESTOCK

CROSS REFERENCE TO RELATED APPLICATIONS

This application is a continuation of U.S. application Ser. No. 12/904,325 filed on Oct. 14, 2010, which is a continuation of PCT application number PCT/NL2009/000090 filed on Apr. 9, 2009 which claims priority from Netherlands application number 1035289 filed on Apr. 14, 2008. The contents of all of these applications are hereby incorporated by reference in their entirety.

BACKGROUND OF THE INVENTION

1. Field of the Invention

The application relates to the separating of livestock, in particular cattle. The application also relates to the sorting of livestock, in particular cattle.

2. Description of the Related Art

Livestock has to be regularly moved, for example from one grazing area to another grazing area, or from a grazing area to a milking area. Livestock originating from various regions and for various destinations has in this case to be steered in quick succession to the right destination.

For separating animals from a group of animals moving in a series, swing gates or other separation gates are provided with closing means and/or locking means. Thus, separation gates can usually be in the closed position and be opened as desired, for example by cylinders, or be released by removing a lock, for letting animals through. Alternatively or additionally, separation gates can be closed using closure means, such as cylinders, when separation is desirable. Whether closure is desirable can for example be specified by determining data from each animal, referred to here as ID for short.

During the closing of a separation gate, speed is a condition for an efficient process. Another requirement is that the animals should run as little risk as possible of becoming injured by a closing gate. Both requirements can lead to contradictory approaches to the design of separation gates.

For sorting livestock, use may be made of what are known as sorting arrangements, comprising a gate assembly having an entry port, delimited by side gates, the port containing a swing gate provided with one or two rotatable gate leaves, and downstream of the swing gate two or more exit ports, wherein one or more movable sorting gates are placed between the swing gate and the exit ports. By adjusting the position of the sorting gate or the sorting gates, the entry port can be connected to a selected port of the exit ports to guide the livestock thereto.

The movement of the sorting gates can take place automatically, activated by a central controller wherein the need to convert a sorting gate is ascertained by measuring data from the arriving animals. However, in an automated system of this type, it can occur that one or more animals are still located next to a sorting gate when that gate is moved, resulting in injuries and stress.

SUMMARY OF THE INVENTION

An object of the invention is to provide a gate system for separating animals in a series of animals, and also a process therefor, with which there is a reduced risk of injury to the animals.

In one aspect, the invention provides for this purpose an assembly consisting of a passageway, delimited by side delimitations, for livestock, such as cattle, from a first space to a second space, wherein a gate system is mounted in the passageway, wherein the gate system has at least one self-closing gate leaf which is movable between a closed position and one or more open positions including a pass position in which passage to the second space is possible for an animal from the livestock, wherein the gate leaf is arranged for movement to an open position by the exertion of pressure by an animal from the livestock passing through the passageway to the second space, wherein the assembly is also provided with a device for determining an ID of an animal from the livestock, and a device for blocking movement of the gate leaf to a pass position, which blocking device can be activated to a blocking position in response to data from the ID determining device.

Thus, animals for which it has been ascertained that they may move to the second space can pass through the gate system without difficulty. After each animal which has been let through, the gate leaf will immediately carry out a closing movement; this will be observed by the following animal in the series, which will as a result stop momentarily, thus slowing things down. If it has been ascertained based on the ID determination of that animal that it must not be allowed to pass, then the activated blocking device will prevent that animal from subsequently being able to obtain passage by pushing against the gate leaf. The aforementioned hesitation can in this case already have as a consequence that the time wherein the gate leaf can carry out a closing movement is extended. As a result of the slowing-down, the impetus of the movement of the animal against the gate leaf will be reduced in such a way that the risk of injury is slight. The self-closing gate leaf itself can be embodied in a known manner, for example with a non-vertical axis of rotation.

In a compact embodiment, the blocking device is positioned entirely on the side of the gate leaf facing towards the second space.

The movement of the gate leaf to a pass position on passing of animals to be let through remains unimpeded, apart from the self-closing aspect, if the blocking device in the deactivated position is positioned at a distance from the gate leaf in the closed position.

The blocking device comprises preferably a stop for blocking abutment against the surfaces of the gate leaf which face the second space. The assembly can in this case be provided with means for bringing the stop into and out of the path of movement of the gate leaf.

In a further development thereof, the assembly comprises means for moving the stop between a number of positions which are positioned within the path of movement of the gate leaf and are positioned at a distance from one another along the path of movement. Thus, the stop can be operative in a plurality of positions of the gate leaf. Alternatively described, the assembly can be provided with means for forcing the gate leaf by moving the stop in the direction of the closed position. If an animal must not be allowed to pass, the stop can be moved up to the gate leaf. The gate leaf can in this case already have returned to the closed position, in which case the abutment position is fixed. If the animal in question has already been able to touch the gate leaf, the gate leaf will already assume an—unknown—open position. The stop then moves against the gate leaf in said open position, wherein the gate leaf is however impeded from opening further. Further movement of the stop will allow the gate leaf to be forced to the closed position. The stop thus carries out a two-stage movement. In the first section, rapid movement of the stop allows the gate leaf to be detained; in the second section, the animal is driven back by the gate leaf.

From a further aspect, the application also provides an assembly consisting of a single passageway, delimited by side delimitations, for livestock, such as cattle, from a first space to a second space, wherein a gate system is mounted in the passageway, wherein the gate system has at least one self-closing gate leaf which is movable between a closed position and one or more open positions, including a pass position wherein for an animal from the livestock passage from the first space to the second space is possible, wherein the gate leaf is arranged for movement to an open position by the exertion of pressure by an animal from the livestock passing through the passageway to the second space, wherein the assembly is also provided with stop device, which can be placed on the side of the second space of the gate leaf, from a rest position into the swivel path thereof into an active position, for preventing the gate leaf from moving into a pass position. In this case, the stop device can be arranged in the active position for abutment against surfaces of the gate leaf which face the second space. The thus described assembly can also comprise means for moving the stop between a number of positions which are positioned within the path of movement of the gate leaf and are positioned at a distance from one another along the path of movement. The movement means can in this case be configured for moving the stop from a position detaining the gate leaf in an open position to a position holding the gate leaf in the closed position. The assembly can also be provided with means for determining an ID of an animal from the livestock, wherein the stop device can be activated to a blocking position for the gate leaf in response to data from the ID determining means.

In a further development of the assemblies described hereinbefore, the assembly is provided with means for observing a position of the gate leaf, wherein the blocking or else stop device are movable to a blocking position as a function of the registration of the gate sensor.

In the above-described case of two-stage movement, the blocking or stop device can be movable at a first speed to the position detaining the gate leaf in an open position and at a second, lower speed to a position holding the gate leaf in the closed position. This allows the animal to be driven back in a gradual, gentle manner.

In a further development, the assembly is provided with a device for observing a position of the gate leaf, and with counting device for generating a count signal as a function of a defined swiveling movement, observed by the gate sensor, of the gate leaf. Thus, the movement, induced by the animals themselves, of the gate leaf can be applied for counting the number of animals which have passed through the passageway. This allows the reliability of the count to be increased.

The counting device can in this case be configured for generating a count signal as a function of the extent, observed by the gate sensor, of the swiveling movement of the gate leaf. The extent of the swiveling movement, which is indicative of the count, can for example be the maximum possible swiveling movement or, if the animals do not have the maximum size for passage, a smaller swiveling movement wherein passage of said animals is still possible.

Alternatively or additionally, the counting device can be configured for generating a count signal as a function of the duration of the swiveling movement, observed by the gate sensor, of the gate leaf. Thus, a count signal can for example be generated when a swiveling movement making passage possible occurs for an average passing time (or a somewhat longer period).

Alternatively or additionally, the counting device can be configured for generating a count signal as a function of the pattern of movement, observed by the gate sensor, of the door leaf in a period between two successive closed positions. In this case, reference may be made to the contour of the animal, wherein for example the passage of the shoulder, the flank and the haunches can be observed in succession; this can indicate a complete passage.

For generating a count signal, the assembly can in this case be provided with a control unit comprising a memory and with means for entering into the memory a reference value for the extent of the swiveling movement, the duration of the swiveling movement and/or a pattern of a movement of the gate leaf, and also with means for comparing the extent of the swiveling movement, duration of the swiveling movement observed by the gate sensor and/or the pattern of movement observed by the gate sensor with the reference value or the reference pattern respectively and having the counting device generate, on the basis of the outcome of said comparison, a count signal for storage in the memory. The control unit can thus add up the count signals generated, wherein the added-up value can be used as an input value for controlling a livestock guiding or sorting process, or other livestock handling processes.

The gate system can be embodied with just one gate leaf. Alternatively, the gate system can comprise two gate leaves which can swivel about their own swivel axes positioned in respective side delimitations. In that case, the width of the passage to be made by the animals will be defined by the angular extension of both gate leaves. For this purpose, the gate sensor can be provided for observing the movement of both gate leaves and the control unit be configured for comparing a reference value for a combined extent of the angular extensions, the duration of the angular extensions and/or a pattern of movements of the gate leaf with those which have been observed and having the counting device generate, on the basis of the outcome of said comparison, a count signal for storage in the memory.

In a further development, the gate system is a one-way gate system which allows merely passage to the second space.

In conjunction with the foregoing, the application provides, from one aspect, a method of guiding livestock in a passageway, wherein the passageway has an entry and exit and is provided with a one-way gate system which can allow merely passage from the entry to the exit, wherein the gate system has at least one self-closing gate leaf which is movable between a closed position and one or more pass positions, wherein a number of animals are allowed in series into the passageway via the entry and the animals are successively subjected, at a distance before the gate leaf, to an ID test and are let through in series to the exit by having the animals successively push aside with their body the gate leaf to a pass position, wherein the gate leaf moves of its own accord to the closed position after each passage of an animal, wherein after the observation of an animal from the livestock having an ID which is undesirable for access, the gate leaf is blocked, after letting through the preceding animal in the series, from moving to a pass position.

If the gate leaf enters the closed position after letting through the preceding animal in the series, the gate leaf can, according to one application, be blocked in said position.

If the gate leaf is held, after letting through the preceding animal in the series, at least somewhat open by the following animal, the gate leaf can, according to another application, be prevented in said position from opening further. The gate leaf can subsequently be forced to the closed position; this, as mentioned hereinbefore, can take place in such a way that the animal is not wounded as a result, i.e. gradually.

An approach of this type can also be followed if the gate leaf is held, after letting through the preceding animal in the series, in the pass position by the following animal (thus further opened than the foregoing paragraph provides for), the gate leaf being forced to the closed position.

In the case in which the gate system comprises two gate leaves which interact in closure, if merely one of the two gate leaves is in the pass position after the preceding animal in the series has been let through, the other gate leaf can be prevented in its position from opening (further). The former gate leaf can in this case be left to close itself or, alternatively, is forced to the closed position.

A further object of the application is to provide a passageway for animals to a following process region with which animals can be counted in a reliable manner.

From a further aspect, the application provides an assembly consisting of a passageway, delimited by side delimitations, for livestock, such as cattle, from a first space to a second space, wherein a gate system is mounted in the passageway, wherein the gate system has at least one self-closing gate leaf which is movable between a closed position and one or more open positions, including a pass position wherein for an animal from the livestock passage to the second space is possible, also provided with means for counting the number of animals which have passed through the passageway to the second space, wherein the counting device are configured for issuing a count signal as a function of a movement, observed by gate sensor, of the gate leaf. The count signal, which is related to the movement of the gate leaf, can be used for managing the gate system and/or for controlling processes following passage. The gate sensor can for this purpose be operatively connected to a control unit to which the counting device are operatively connected; this includes a situation wherein the counting device are integrated into the control unit.

In one embodiment thereof, the gate leaf is arranged, just as in the above-discussed assembly according to the application, for movement to an open position by the exertion of pressure by an animal from the livestock passing through the passageway to the second space. The movement of the gate is thus introduced by the animals themselves, as is the counting resulting therefrom.

The counting device can in this case be embodied as discussed hereinbefore.

A further object of the application is to provide a sorting arrangement for animals, and also a sorting process, with which animals can be led in a safe manner to various successive destinations.

From one aspect, the application provides a system for sorting livestock, comprising a sorting compartment surrounded by delimitations, an access port to the sorting compartment and two or more exit ports from the sorting compartment, and at least one movable sorting wall, such as a sorting gate, wherein the entry port and the exit port each have at least one gate leaf which is movable between a closed position and one or more pass positions, also comprising first counting device for ascertaining a passage of an animal through the access port and second, third, etc. counting device for ascertaining a passage of an animal through a respective exit port, and a programmable control unit to which the aforementioned counting device are operatively connected, wherein the system is also provided with first closing means for holding the access port in a closed position, wherein the system further comprises drive unit for moving the sorting wall from a position steering the livestock from the access port to a first exit port to a position steering the livestock from the access port to a second exit port, wherein the control unit is configured for activating the drive unit for the sorting wall on the basis of a comparison of the data from the second counting device with the data from the first counting device. The automatic movement of the sorting wall is thus related, as a function of a condition, to the number of animals which have entered and the number of animals which have been let out. In particular, the control unit can in this case be configured for activating the drive unit for the sorting wall on the condition of absence, defined by the control unit, of animals in the sorting compartment in use. This rules out the risk of an animal still being located or becoming enclosed in the path of movement of the sorting wall to be moved.

The control unit is configured for deactivating the first closing means after a desired movement of the sorting wall has elapsed.

The entry port can be embodied in accordance with one or more of the above-discussed aspects of assemblies according to the application.

In conjunction with the discussion of the immediately foregoing aspect, the application provides, from one aspect, a method of sorting livestock with the aid of a sorting compartment which is surrounded by delimitations and has an access port to the sorting compartment and two or more exit ports from the sorting compartment, and at least one sorting wall which can be moved by drive unit which can be activated by a control unit, such as a sorting gate, with which a connection between the access port and a selected port of the exit ports is defined, wherein the entry port and the exit ports each have at least one gate leaf which is movable between a closed position and one or more pass positions, wherein each passage of an animal from the livestock through the access port is counted by an automatic first counter and each passage of an animal from the livestock through the selected exit port is counted by an automatic associated counter, wherein a certain time after a closure of the access port the data from both counters are compared with one another in the control unit and, on ascertainment of unequal count values therefor, the control unit does not activate the drive unit.

In one application, the control unit can activate the drive unit on ascertainment of equal count values, to move the sorting wall in order to start to define a connection between the access port and a selected other exit port, after which the control unit releases the access port again.

On ascertainment of a higher count value for the access port than for the exit port, the control unit can, in one application, activate the drive unit for driving animals present in the connection to the exit port.

The comparison can be repeated until it is ascertained that both count values are equal.

The count can be based on the movement of angular extension of the gate leaf, in particular on the number of times that the gate leaf reaches a defined angular extension and/or on the number of times that the gate leaf reaches a defined angular extension within a defined period and/or on the number of times that the gate leaf in the extended position follows a predefined pattern over a defined period.

It should be noted that WO 2004/049790 discloses a passageway, provided with an ID determining device, for a series of animals, in which passageway a port comprising one or two gate leaves is mounted. The gate leaves can be placed in the open position or in the closed position by operating means. According to the document, the position of the port can be controlled as a function of the perceptions from one or more sensors which are arranged to observe a defined presence of the body of an animal. The perceptions by the sensors can be used for counting the number of animals which have passed through the passageway. A plurality of sensors can be placed in the direction of movement at a distance from one another in order thus to record an image of the contour, based on which it is possible to define whether an animal is present at a defined location. Alternatively, the sensor can be arranged to observe a parameter which is related to the cross section of the animals, such as the width.

WO 01/08468 discloses an arrangement wherein a two-way gate is placed between two spaces, wherein a catch usually blocks rotation of the gate leaf from the closed position to the open position; when it has been ascertained with the aid of an ID determining device that an animal may pass the gate, the catch is moved out of the blocking position to allow rotation of the catch leaf to the open position.

German utility model 200 18 646 discloses a sorting arrangement with two exit paths, wherein a sorting gate is placed after a measuring sluice. The sluice is accessible via a two-way gate and is provided with a weighing platform and a sensor for defining the shoulder height of the animal in the sluice. During the measuring, the sorting gate closes off both exits. Depending on the measurement, the sorting gate opens one or else the other exit path. With the aid of photosensors in the measuring sluice and the two exit paths, it is possible to observe whether and possibly where an animal is located in the sorting arrangement.

WO 95/05735 discloses a sorting arrangement with two exit paths, wherein a gate comprising two gate leaves is placed at the end of an entry path. In the entry path, ID determining means are used to determine at two locations the ID of the animal which is located there. The sorting direction, which can be adjusted using a sorting gate mounted directly downstream of the entry path, is related to the ID. If both ID determining devices give the same sorting direction, the gate remains open; if they give a different sorting direction, the gate is closed and the sorting gate converted.

The aspects and features described in this description and claims of the application and/or shown in the drawings of this application may, where possible, also be applied separately from one another. These separate aspects, such as the blocking of the gate leaf, the counting of the number of animal passages on the basis of movements of the gate leaf, and the activating of a movable sorting gate as a function of presence of animals in the sorting compartment, and other aspects may form the subject matter of divisional patent applications relating thereto. This applies in particular to the features and aspects which are described in the sub-claims.

BRIEF DESCRIPTION OF THE DRAWINGS

The inventions discussed hereinbefore will be described based on a number of exemplary embodiments illustrated in the appended drawings, in which:

FIG. 2 shows details of the sorting device from FIG. 1, at the location of an entry gate;

FIG. 2A is a view looking onto a portion of the entry gate from FIG. 2;

DESCRIPTION OF ILLUSTRATIVE EMBODIMENTS

Figure 1:
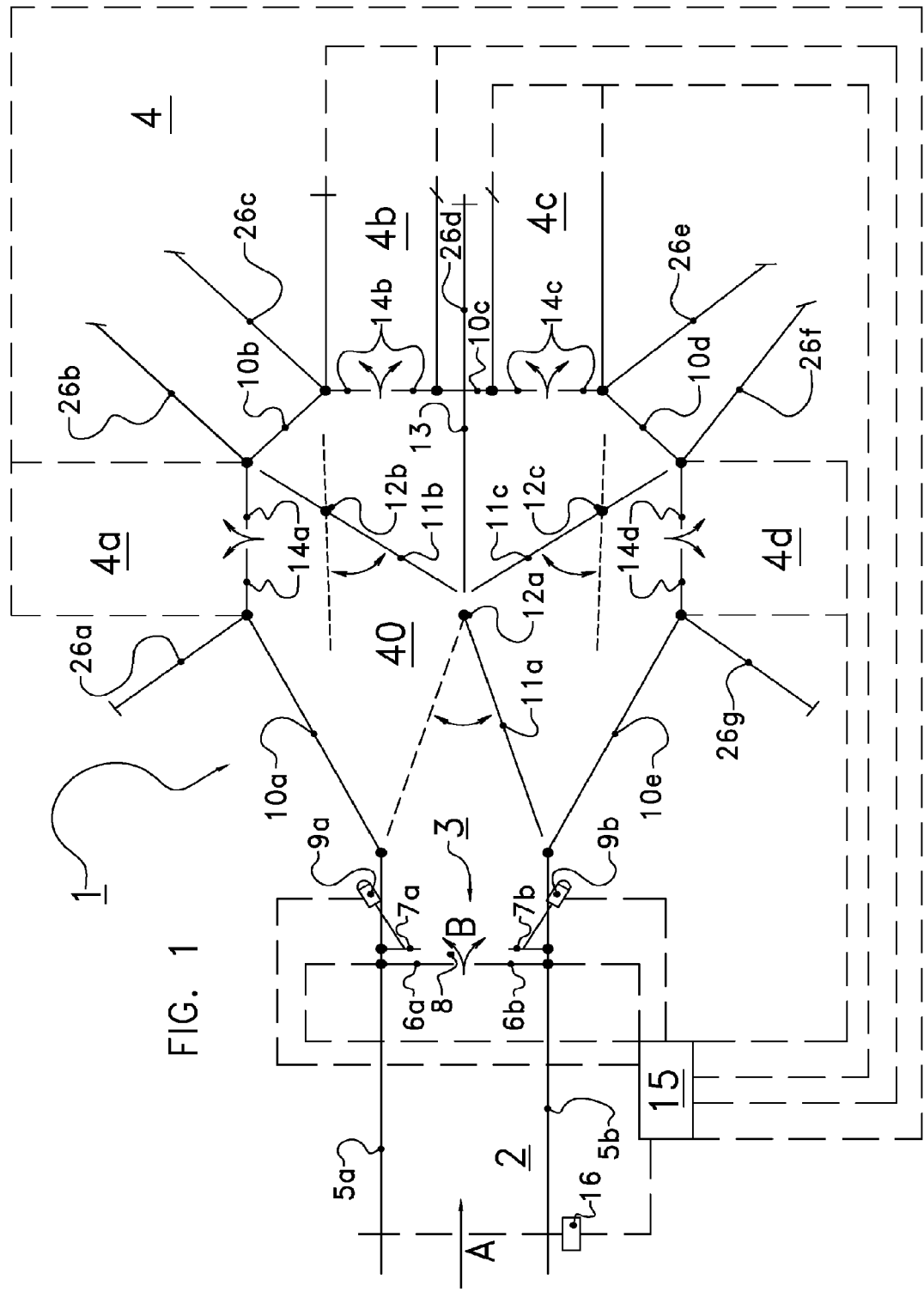
FIG. 1 is a schematic illustration of an exemplary embodiment of a sorting system according to the invention.

The following is a description of certain embodiments of the invention, given by way of example only and with reference to the drawings. The livestock sorting system 1 in FIG. 1 comprises an entry 2 which is laterally delimited by gates 5a and 5b. Located in the entry 2 is an entry gate system 3 comprising two gate leaves 6a, 6b which can swivel open merely in one direction (B), by swiveling about vertical axes, to free up a passageway 8 in the direction A. Two stops 7a, 7b, which can swivel about vertical axes and are operated using cylinders 9a, 9b, are arranged immediately after the gate leaves 6a, 6b.

Located downstream (viewed in direction A) of the gate system 3 is a sorting space 40, delimited by gates 10a, 10b, 10c, 10d, 10e and exit gate systems comprising exit gates 14a, 14b, 14c, 14d which likewise can open merely in one direction, namely from the space 40 outward, in order respectively to provide a passage to process spaces 4a, 4b, 4c, 4d which are positioned in region 4 and are respectively delimited by gates 26a,b, 26c,d, 26d,e and 26f,g.

Arranged within the sorting space 40 are various sorting gates 11a, 11b, 11c which can respectively swivel about vertical axes 12a, 12b, 12c, with the aid of activatable drives, and also a fixed gate 13. Correct adjustment of the sorting gates 11a, 11b, 11c allows a walking connection to be established between the entry gate system 3 and a selected exit gate 14a, 14b, 14c or 14d.

A central control system 15, equipped with an operating/input panel and programmable computer, is provided for the processing of signals from various detectors which are placed in the sorting system 1 and will be discussed hereinafter and activation of various drives. Some of the signal/control lines are represented by broken lines.

FIG. 2 shows in greater detail the entry 2 comprising the entry gate system 3. An ID reader 16, which operates for example using infrared and with which a transponder on a cow (K1) can be read to identify the cow in the central control system 15, is mounted at a distance before the gate leaves 6a, 6b.

The gate leaves 6a, 6b have stands 20a, 20b. Just like the gate leaves of the exit gates 14a-d, the gate leaves 6a, 6b are self-closing. That is possible using spring devices or, as illustrated in FIG. 2A, by embodying the stand (here 20b) in a divided manner with a fixed component 24 and a rotatable upper part 25 which rests on the component 24 via a support face rising in the circumferential direction, so that on rotation (B) the upper part is forced upward (C), counter to gravity, when an opening force is exerted on the gate leaf 6b. When said force ceases to be applied, the upper part 25 rotates back of its own accord to the closed position of the gate leaf 6b. An alternative is the placing of the axes of rotation of the gate leaves at an inclination.

On the outside, the upper parts 25 of the gate leaves 6a, 6b are provided with a detection arm 18a, 18b which can be detected by a sensor 17a, 17b on the gate 5a, 5b. The sensor 17a, 17b can for example be a proximity sensor which issues a signal when the arm 18a, 18b has arrived at a defined distance, or a series of sensors of this type when it is desirable to obtain more information concerning the swivel position of the gate leaves 6a, 6b. Use may also be made, in addition to a proximity sensor, of an angular extension detector, for example comprising a potentiometer wherein the measured tension is a measure for the angular extension. It will be understood that during the placing of the sensors 17a, 17b, etc., allowance is made for the vertical movement (C) if the self-closing construction of FIG. 2A is applied.

Directly downstream, on the exit side of the passageway 8, the stops 7a, 7b can swivel (E) about stands 21a, 21b. The ends of piston rods of hydraulic or pneumatic cylinders 9a, 9b are rotatably fastened to the free ends of the stops 7a, 7b. At their other end, the cylinders 9a, 9b are rotatably fastened to supports 23a, 23b which are securely fastened to end gates 22a, 22b. The position of the cylinders 9a, 9b is recorded by sensors 19a, 19b which are operatively connected to the control system 15.

Figure 3A:
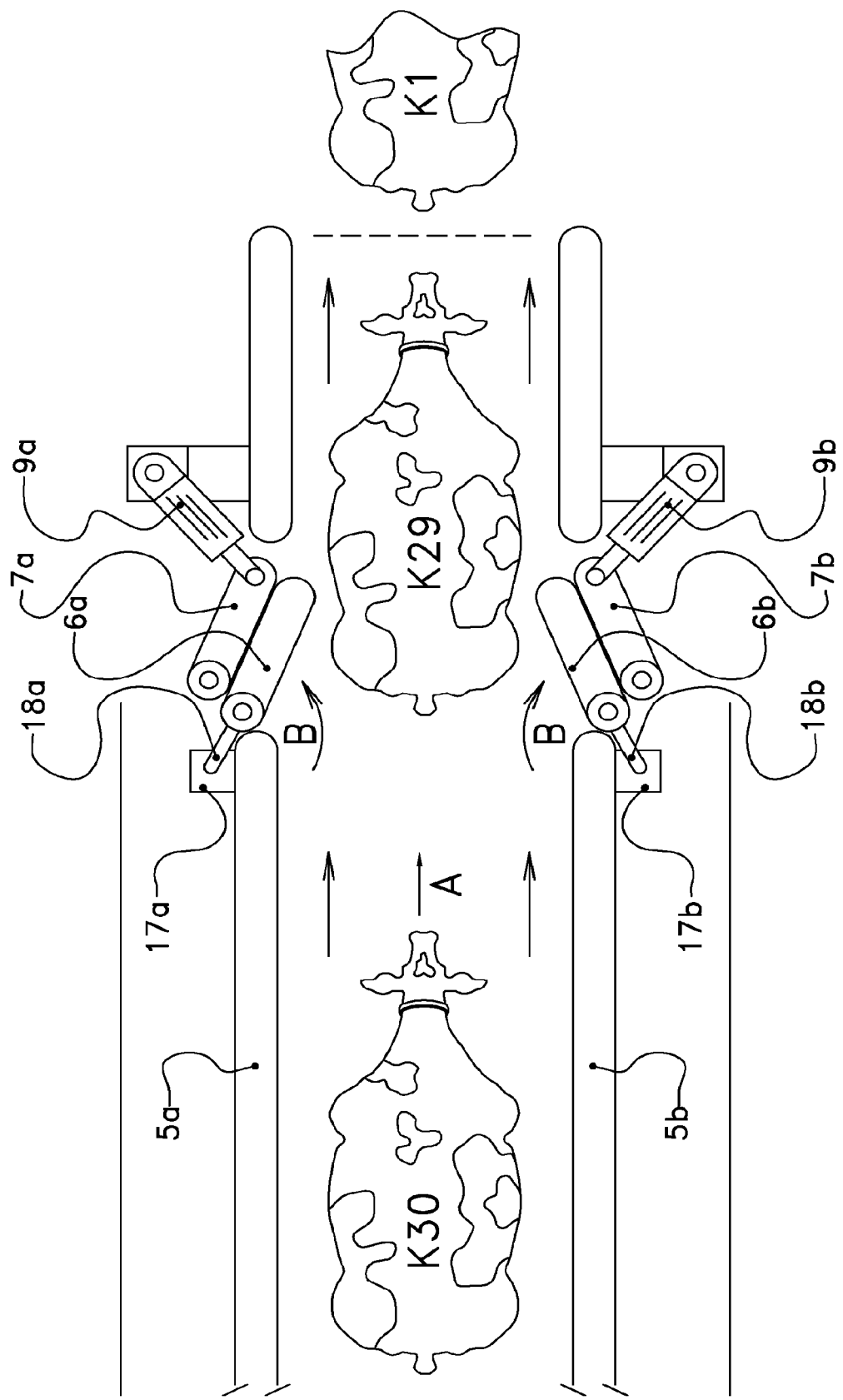
FIGS. 3A-C show successive stages in the use of the access gate from FIG. 2.
Figure 3B:
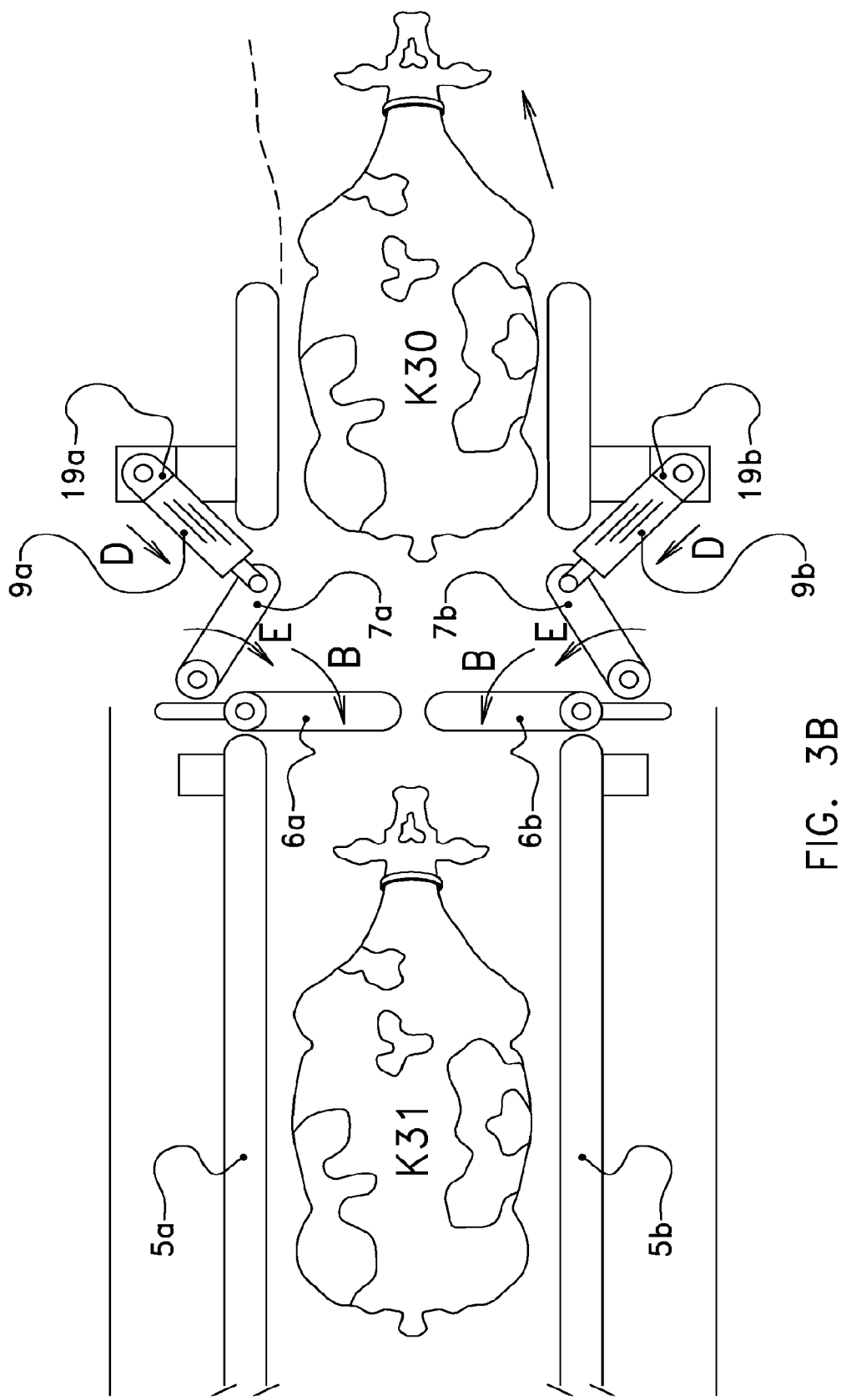
Figure 3C:
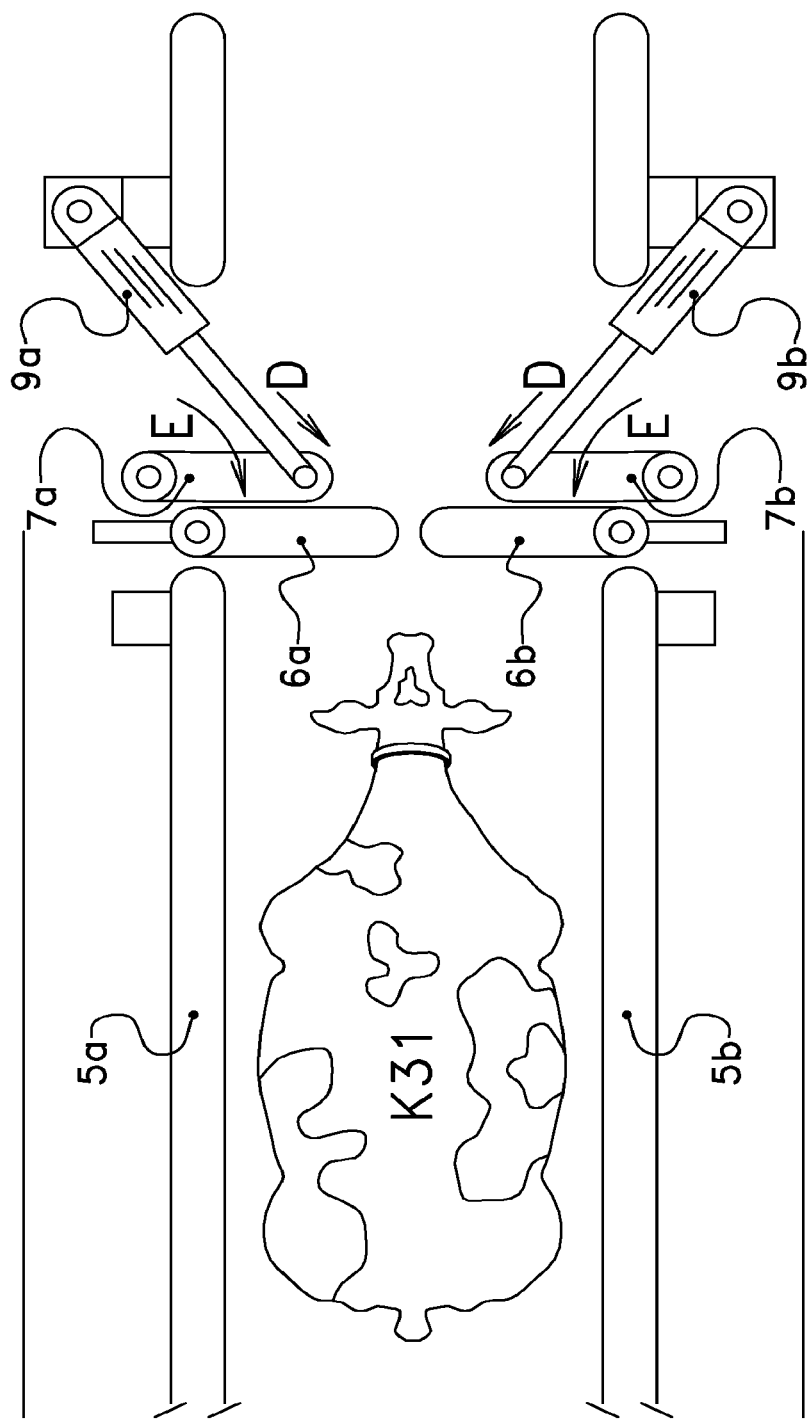

If during use, a series of cows K1 etc. have to pass through the entry 2, the cylinders 9a, 9b are left in the retracted position, so that the swiveling movements of the gate leaves 6a, 6b are not impeded by the stops 7a, 7b. The cows K1-K29 are successively observed by the ID sensor 16 and it is ascertained by the control system 15 that they must be allowed to pass. The cows K1-K30 can easily obtain access by passing through and pushing the gate leaves 6a, 6b open using their body (FIG. 3A). After each passage, the gate leaves 6a, 6b fall back of their own accord into the closed position illustrated in FIG. 3B. The following cow, for example K30, sees the gate leaves 6a, 6b swivel toward it and form an apparent barrier, as a result of which it will to some degree slow down. That effect can be utilized when cow K31 is observed by the ID sensor 16 and it is ascertained by the control system 15 that this cow may not (yet) pass. Because the cow K31 has stopped momentarily, there may be enough time to expand (D) the cylinders 9a, 9b, activated by the control system 15, in order to have the stops 7a, 7b swivel (direction E) at high speed (V1) up to or close to the sides of the gate leaves 6a, 6b which face the exit, and to hold them in this position. When cow K31 subsequently seeks to push open the gate leaves 6a, 6b, opening is prevented by the stops 7a, 7b (FIG. 3C).

Figure 3D:
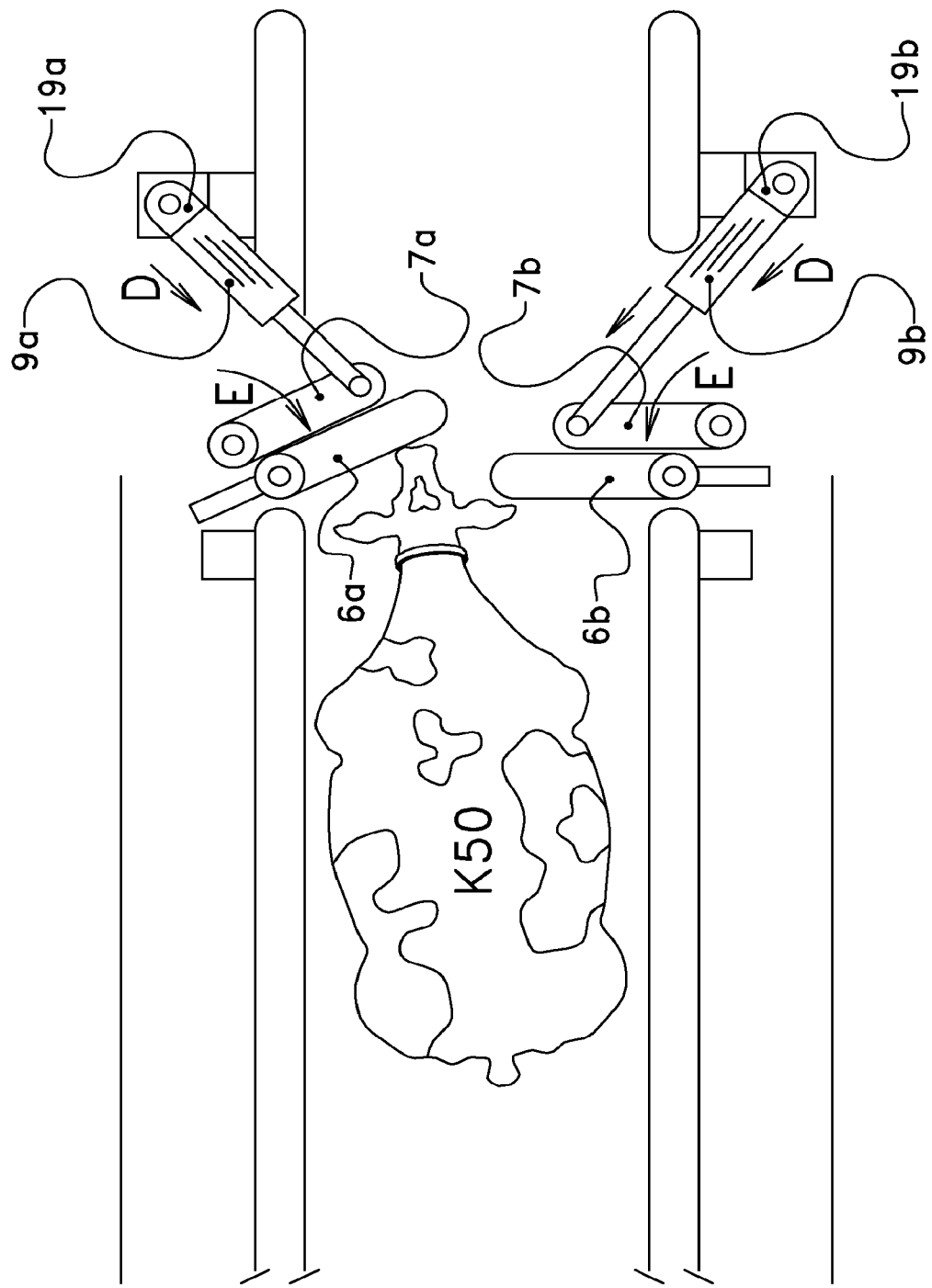
FIGS. 3D and 3E show successive stages in another use of the entry gate from FIG. 2.
Figure 3E:
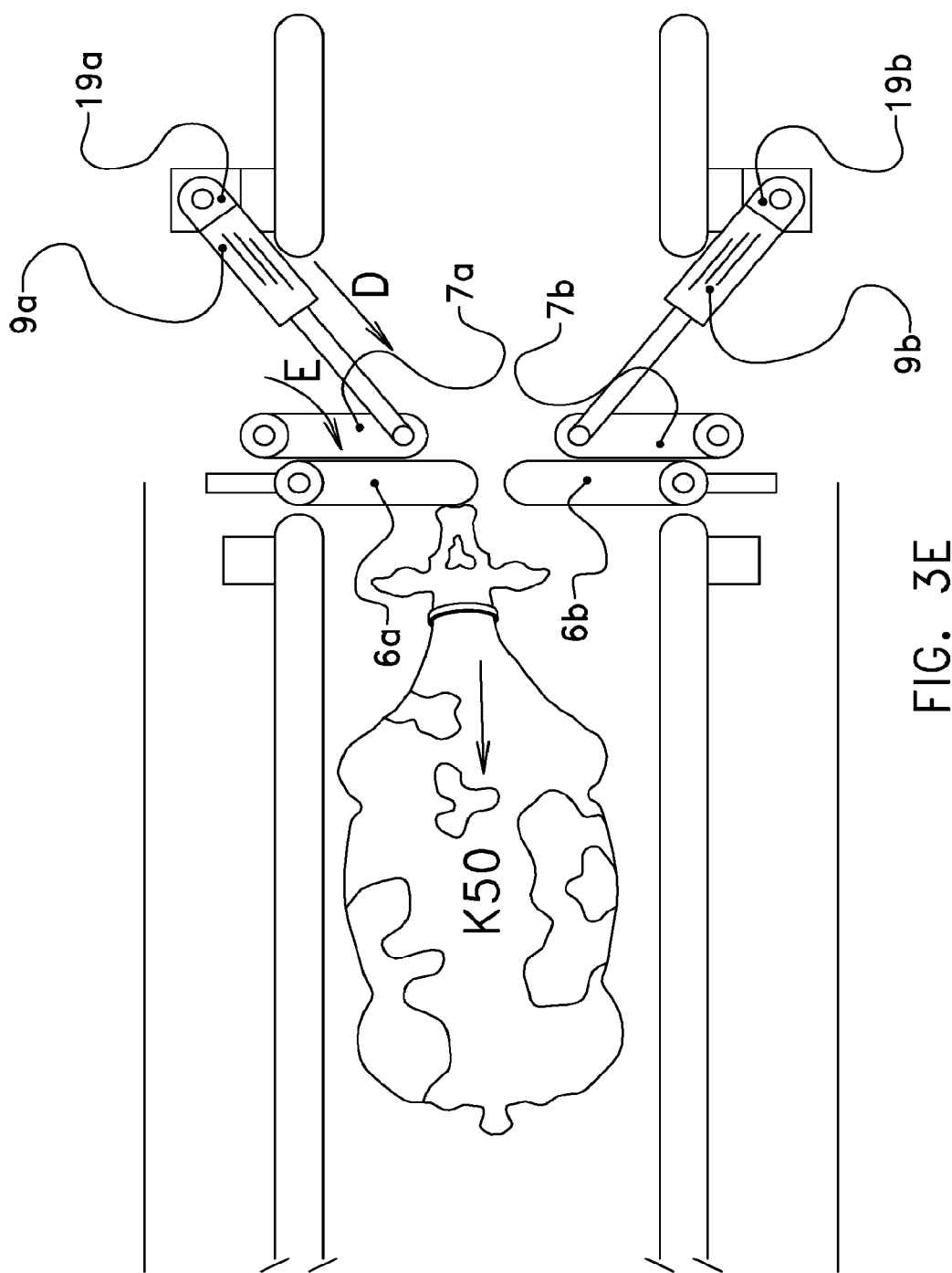

If the cow which is not to be let through (e.g. K50, see FIG. 3D) is walking too close to the preceding cow, for example with its head right behind the rear of the preceding cow, complete self-closing can be prevented. As illustrated in FIG. 3D, the cow K50 may have prevented closure of the gate leaf 6b with its snout. Because cow K50 may not be let through, the cylinders 9a, 9b are activated. The cylinder 9b can perform its operating stroke completely and unimpeded. The cylinder 9a can be expanded unimpeded (speed V1) until the stop 7A is placed against the somewhat open gate leaf 9a. From that moment, the gate leaf 9a cannot be pushed open any further. The operating pressure for the cylinders 9a, 9b is such that the cylinder 9a can force the gate leaf 6a, counter to a force of resistance supplied by the cow K50, to the closed position. That then takes place at a lower speed V2 than in the first section of movement of the stops. The cow K50 is in this case driven back by the closing movement of the gate leaf 6a, to the position of FIG. 3E.

If the region downstream of the entry gate system 3 is ready for receiving cow K50, the cylinders 9a, 9b can be retracted back to the position, illustrated in FIG. 3A, of free passage.

Figure 5A:
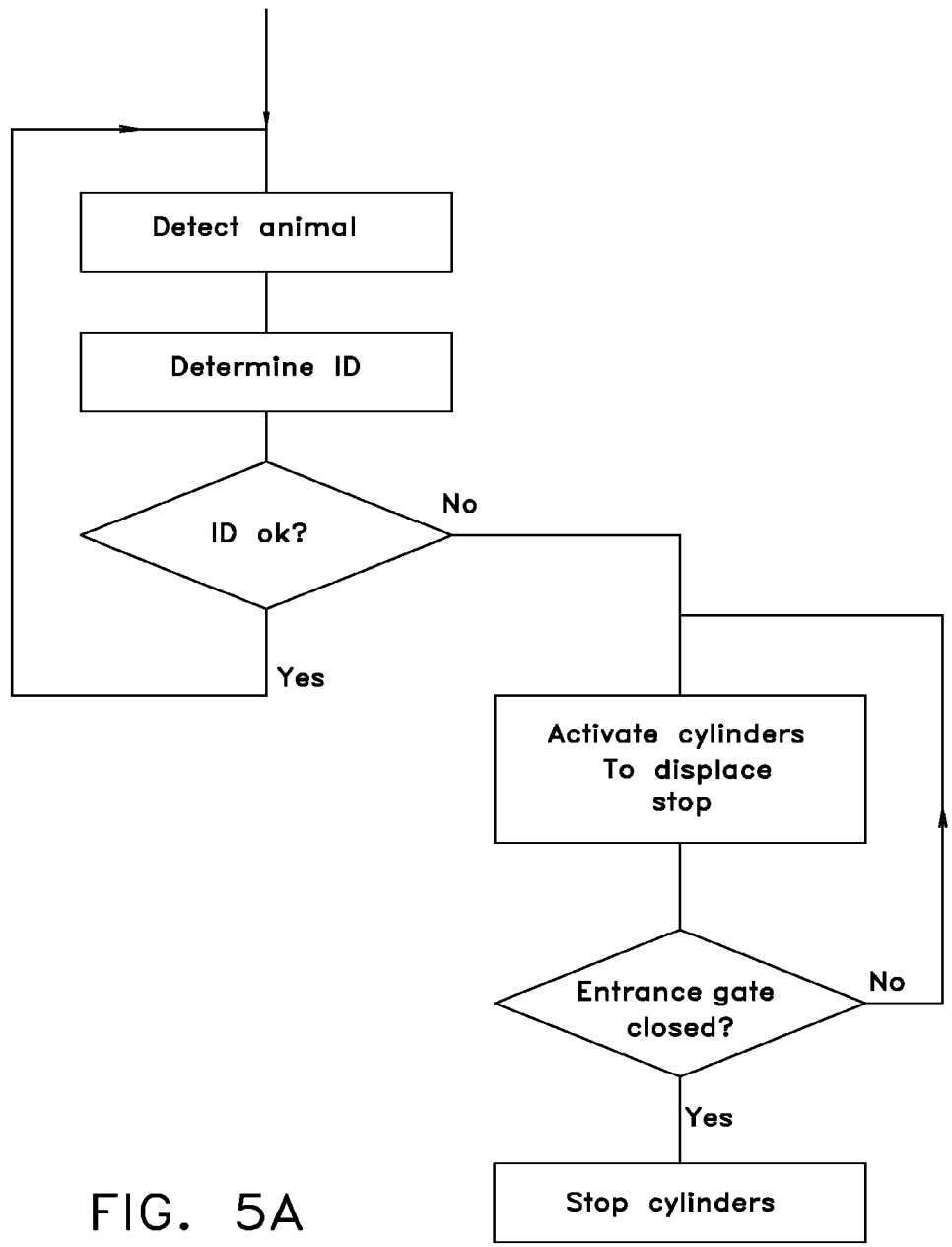
FIGS. 5A-D are various flow diagrams illustrating use of the entry gate of FIG. 2 and the sorting system of FIG. 1.
Figure 5B:
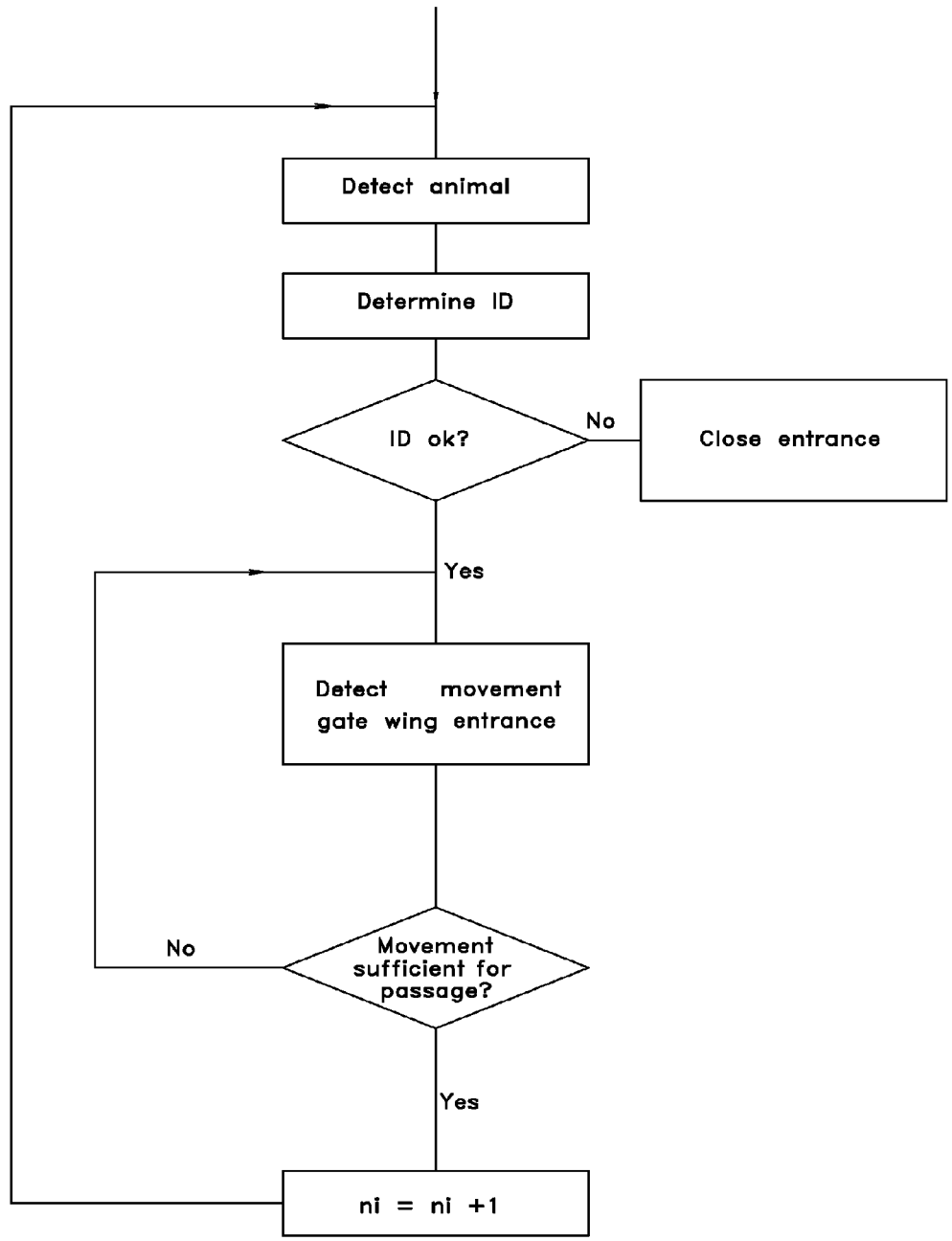

The movement of the gate leaves 6a, 6b, as registered by the proximity sensor(s) and/or angular extension, e.g. swivel, detectors or other suitable detectors, can be used by the control system for ascertaining a passage completed by an animal and counting the completed passages (see flow chart of FIG. 5B). Thus, the occurrence of a maximum angular extension, for example observed by the proximity sensor, of one gate leaf can be processed as the occurrence of a completed passage. It is also possible to elect, depending on the dimensions which are used, to register a completed passage only once both gate leaves have reached a defined angular extension. It is also possible to elect to register a completed passage only once a defined angular extension has been reached/exceeded for a defined time, for which purpose the control system is provided with a timer. It is also possible to elect, if angular extension detectors allow the swiveling movement of one or both gate leaves to be monitored, to infer a pattern therefrom and to have the control system compare that pattern with a reference pattern of the movement of the gate leaf during a passage. In the event of correspondence, within a defined margin, between both patterns, the control system registers a completed passage and the passage is counted.

The control system will be programmed in accordance with the selected processing method and configured therefor.

The entry gate system 3 can be employed at many locations. FIGS. 4A-D illustrate application in the sorting system from FIG. 1.

Figure 4A:
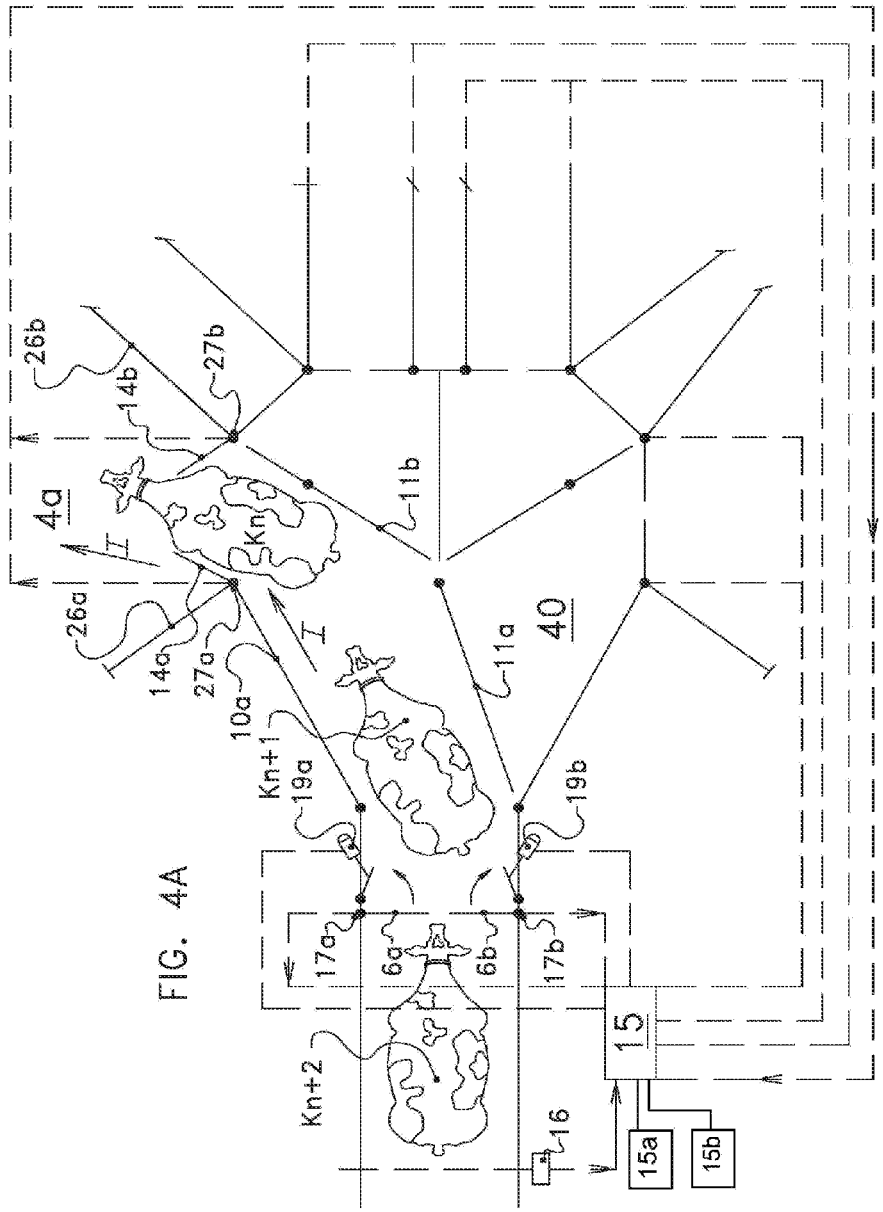
FIGS. 4A-D show successive stages in the use of the sorting system from FIG. 1.
Figure 4B:
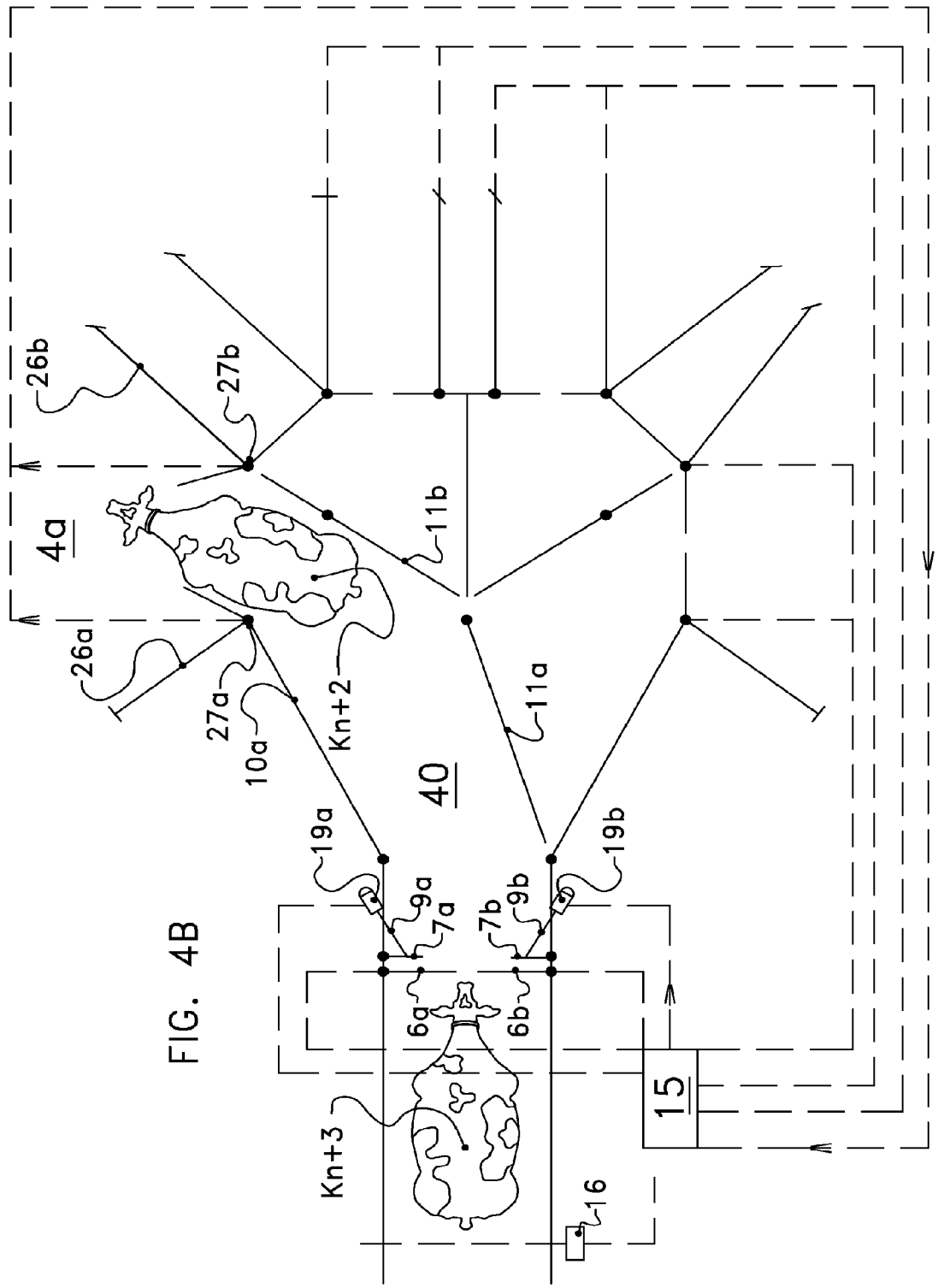

In FIG. 4A, the sorting gates 11a and 11b are placed to define with fixed gate 10a a path I to process region 4a for cows Kn, Kn+1, etc. Provided that the ID sensor observes cows for which the control system is programmed to release the path I, the cows pass through the entry gate system 3 by simply pushing gate leaves 6a, 6b open (the stops 7a, 7b are placed in the rest position), between gates 10a and 11a, 11b through to the exit gate comprising gate leaves 14a which, just like gate leaves 6a, 6b, can be pushed open and are self-closing.

In the manner described above, each completed passage of a cow through the passageway 8 of the entry gate system 3 is registered and counted (Ni). The same registration and counting (Nu) is carried out at gate leaves 14a, in a comparable manner, by the control system 15. A counting device 15a may be operatively connected to the control system 15 or may be integrated into the control unit. The control unit may be further provided with a data entry device 15b for entering into the memory a reference value for the extent of angular extension of the gate leaf, a reference value for the duration of angular extension of the gate leaf, and/or a reference pattern of a movement of the gate leaf. The exit gates are for this purpose also provided with sensors 27a,b, 28a,b, 29a,b, 30a,b for registering the movement of the gate leaves 14a, 14b, 14c, 14d, for example similarly to the gate leaves 6a, 6b, which sensors are operatively connected to the control unit 15.

Figure 4C:
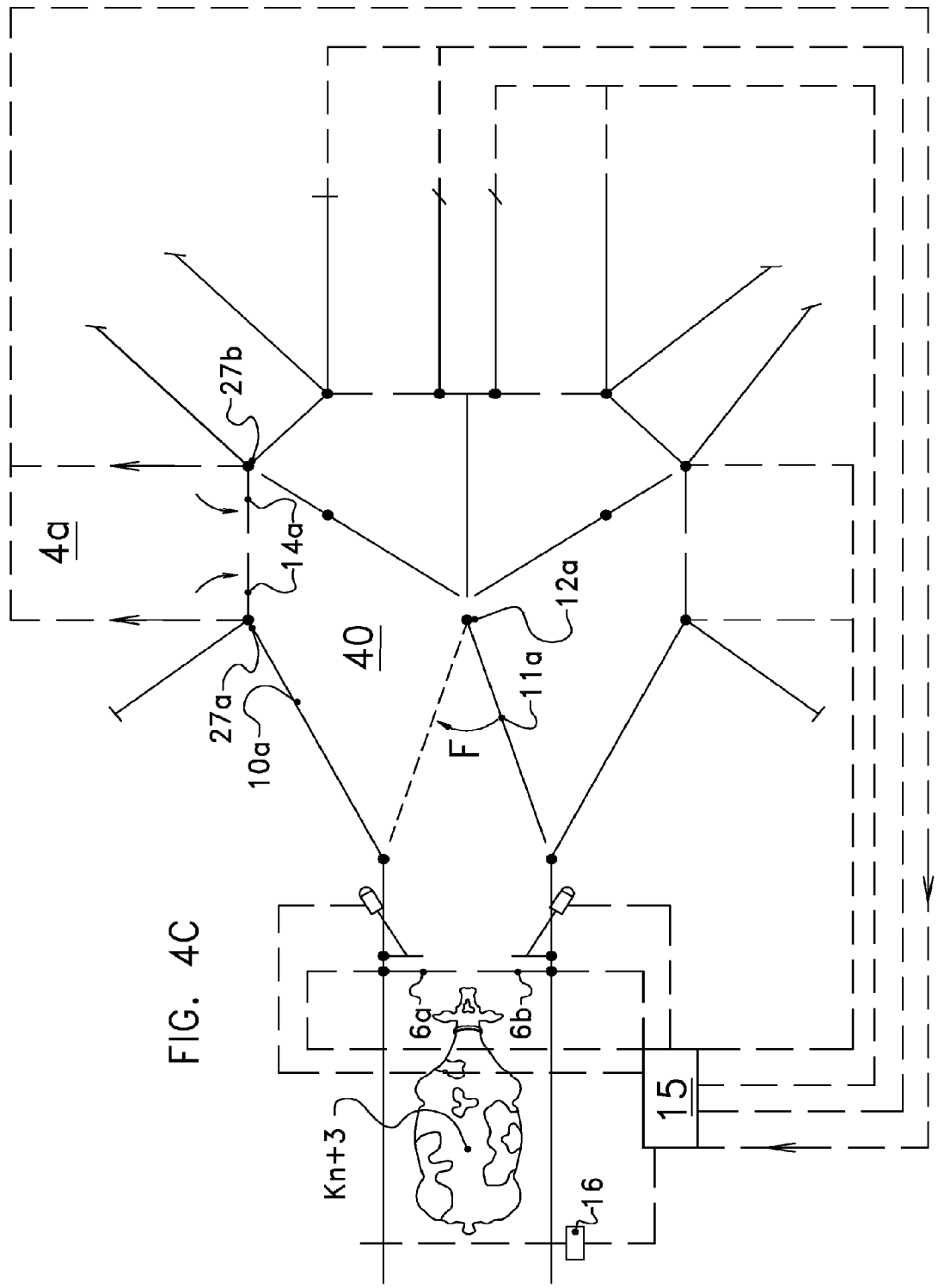
Figure 4D:
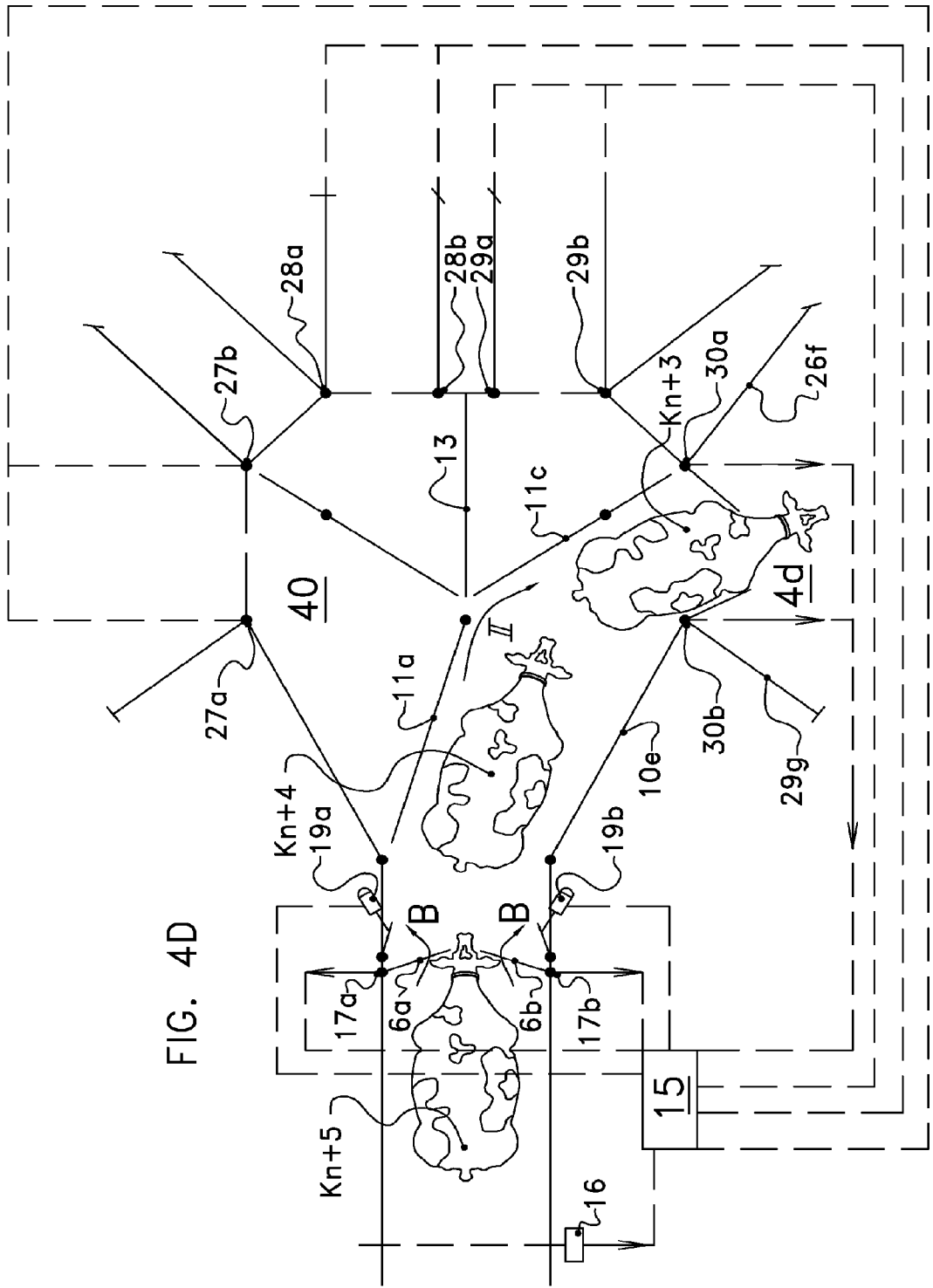
Figure 5C:
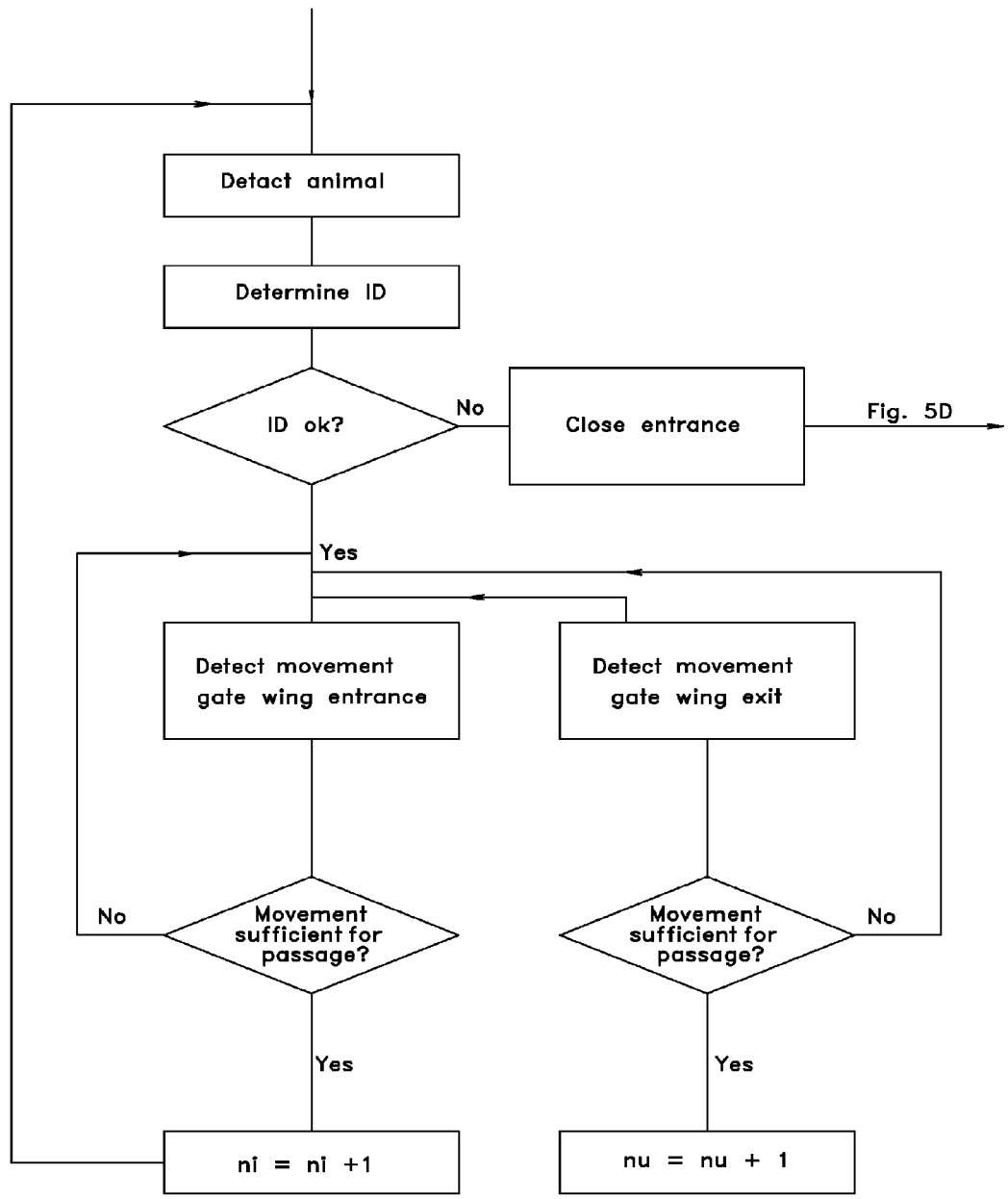
Figure 5D:
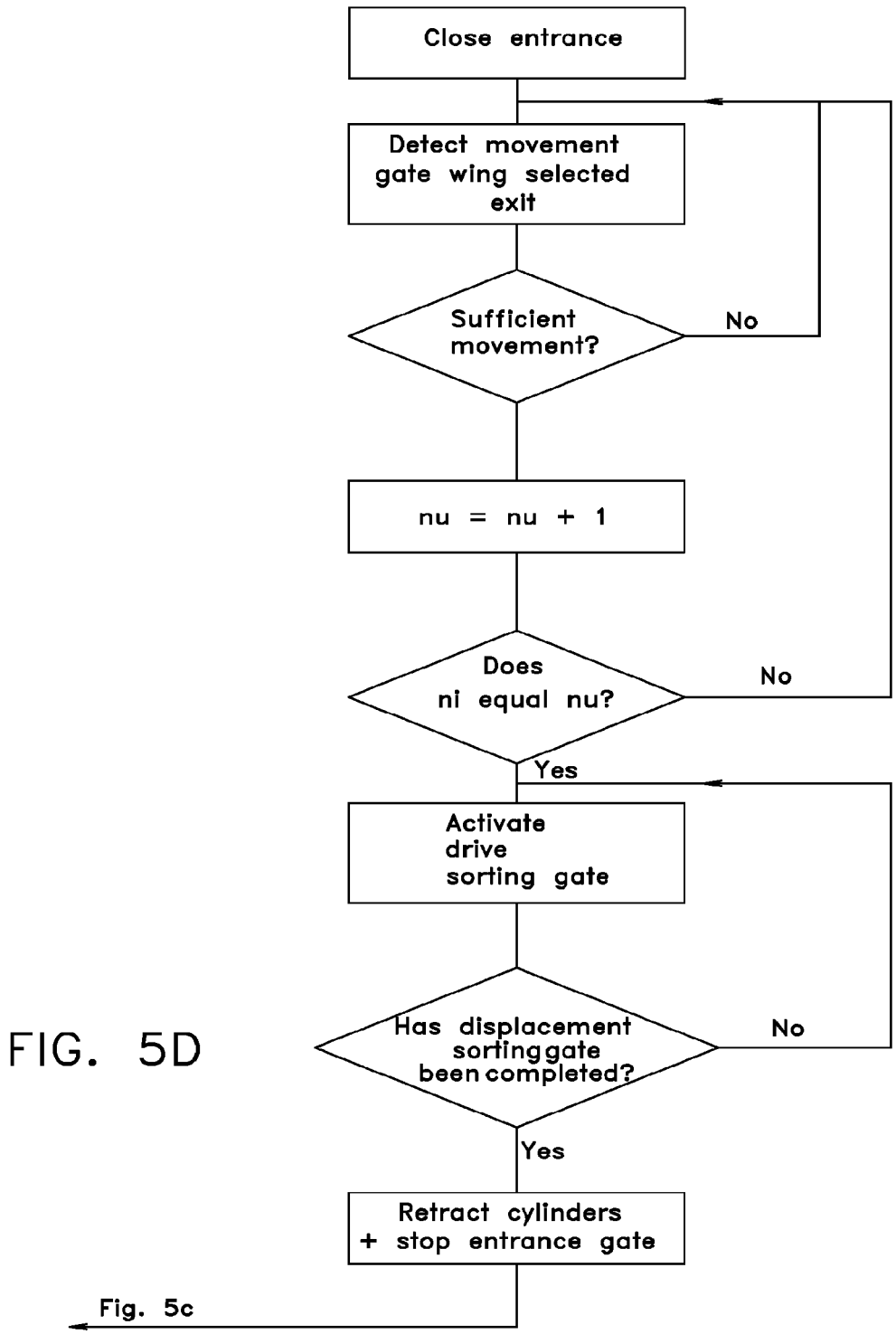

If cow Kn+3 is detected in the entry 2 by the ID sensor (FIG. 4B), the control system 15 ascertains that the cow, and probably the cows walking behind it, are not intended for process region 4a, but for process region 4d. The entry gate system 3 is closed by operating the cylinders 9a, 9b, in the manner described above. Subsequently, the control system 15 compares the values Ni and Nu. If the values differ, indicating that one or more cows are still in the sorting space 40, e.g. on the path I, the movement of the gate leaves 14a is still monitored for a defined time and optionally an ejection device is activated, or else an alarm signal is issued so that a person can intervene. If the control system 15 ascertains that Ni=Nu, it activates the driving of the sorting gate 11a (FIG. 4C). As no cows are present in the sorting space 40, there is no risk of injury to the animals. When the sorting gate 11a is moved, a path II is defined (see FIG. 4D), delimited by the fixed gate 10e and sorting gate 11c. The cows Kn+3, Kn+4, Kn+5, etc. can pass, after the releasing of the gate leaves 6a, 6b by movement of the stops 7a, 7b to the rest position, through path II and leave the sorting space 40 to process space 4d via gate leaves 14d. The movement of the gate leaves 6a, 6b and 14d is again monitored and completed passages at the entry and exit are again counted. An appropriate flow chart is illustrated in FIGS. 5C and 5D.

The foregoing description is intended to illustrate the functioning of preferred embodiments of the invention, and not to limit the scope of the invention. Starting from the foregoing discussion, many variants, which come under the spirit and the scope of the present invention, will be obvious to a person skilled in the art. Accordingly, although specific embodiments have been described, these are examples only and are not limiting upon the scope of the invention.

What is claimed is:

1. Assembly comprising a passageway, delimited by side delimitations, for livestock, from a first space to a second space, wherein a gate system is mounted in the passageway, wherein the gate system has at least one self-closing gate leaf which is movable between a closed position and one or more open positions, including a pass position wherein for an animal from the livestock passage to the second space is possible, also provided with gate sensors for observing a movement of the at least one gate leaf and a counting device for counting the number of animals which have passed through the passageway to the second space, wherein the counting device is configured for issuing a count signal as a function of a movement, observed by the gate sensors, of the gate leaf.

2. The assembly according to claim 1, wherein the counting device is configured for issuing a count signal as a function of an extent, observed by the gate sensors, of a swiveling movement of the at least one gate leaf.

3. The assembly according to claim 1, wherein the counting device is configured for issuing a count signal as a function of a duration of a swiveling movement, observed by the gate sensors, of the at least one gate leaf.

4. The assembly according to claim 1, wherein the counting device is configured for issuing a count signal as a function of a pattern of movement, observed by the gate sensors, of the at least one gate leaf in a period between two successive closed positions.

5. The assembly according to claim 1, wherein the assembly is provided with a control unit comprising a memory and with a data entry device for entering into the memory a reference value for the extent of a swiveling movement, a duration of a swiveling movement and/or a pattern of the movement of the at least one gate leaf, and also means for comparing the extent of the swiveling movement, duration of the extension observed by the gate sensor and/or the pattern of movement observed by the gate sensors with the reference value or the reference pattern respectively, and providing a comparison outcome, wherein the counting device is configured to generate, on the basis of the comparison outcome, a count signal for storage in the memory.

6. The assembly according to claim 1, wherein the at least one gate leaf is arranged for movement to an open position by the exertion of pressure by an animal passing through the passageway to the second space.

7. The assembly according to claim 1, wherein the at least one self-closing gate leaf comprises two gate leaves which can swivel about their own swivel axes positioned in respective side delimitations, wherein the gate sensors are provided for observing the movement of both gate leaves and the control unit is configured for comparing a reference value for a combined extent of the extensions, the duration of the extensions and/or a pattern of movements of the gate leaf with those which have been observed and having the counting device generate, on the basis of the outcome of said comparison, a count signal for storage in the memory.

8. The assembly according to claim 1, wherein the gate system is a one-way gate system which allows merely passage to the second space.

* * * * *